United States Patent [19]
Choi

[11] Patent Number: 5,166,836
[45] Date of Patent: Nov. 24, 1992

[54] DIGITAL SIGNAL DETECTING APPARATUS

[75] Inventor: Young-jun Choi, Kyunggi, Rep. of Korea

[73] Assignee: Samsung Electronics Co., Ltd., Kyunggi, Rep. of Korea

[21] Appl. No.: 640,728

[22] Filed: Jan. 14, 1991

[30] Foreign Application Priority Data

May 31, 1990 [KR] Rep. of Korea .................. 90-8063

[51] Int. Cl.$^5$ .............................................. G11B 5/09
[52] U.S. Cl. ........................................ 360/41; 360/51
[58] Field of Search ............................. 360/51, 41, 46

[56] References Cited

U.S. PATENT DOCUMENTS 4,716,475 12/1987 Dutcher ................................ 360/46

Primary Examiner—Vincent P. Canney
Attorney, Agent, or Firm—Rothwell, Figg, Ernst & Kurz

[57] ABSTRACT

A digital signal detecting apparatus for reproducing high-density digital signals which are recorded on recording media in systems for processing digital signals such as digital VTR's, comprises a rectifier for rectifying a negative voltage of the signal reproduced through a recording head, a reproducing amplifier and an equalizer into a positive voltage; a comparator for generating a rectangular waveform by comparing the output signal of the rectifier with a reference signal; a frequency multiplier for multiplying the reproduced signal which is inputted as a level-controlled state by a PLL (Phase Locked Loop) for outputting the synchronized clock signal by comparing the phase of the signal outputted from the frequency multiplier with the phase of the frequency-divided signal thereof; and a data detector for detecting the original digital data signal from the signal outputted from the comparator by utilizing the clock signal fed from the PLL, for outputting NRZ (Non-Return to Zero) digital data signal to be demodulated in the demodulator.

7 Claims, 4 Drawing Sheets

FIG.4E $V_R$ 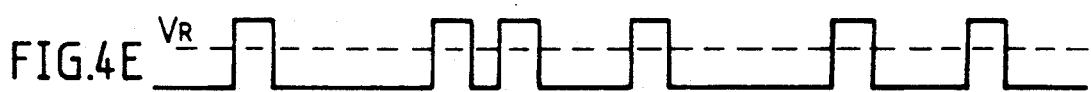

DIGITAL SIGNAL DETECTING APPARATUS

BACKGROUND OF THE INVENTION

The present invention relates to a digital signal detecting apparatus, and more particularly to a digital signal detecting apparatus for reproducing high-density digital signals which are recorded on a recording medium in systems for processing digital signals such as digital videotape recorders (VTR).

The schematic diagram for a conventional digital signal detecting apparatus is shown in FIG. 1. In FIG. 1, a reproducing head 2 transforms a magnetic digital signal which is recorded on magnetic tape 1 into an electric signal and inputs this data signal into a reproducing amplifier 3. The data signal, which is deteriorated during amplification in the reproducing amplifier, is compensated in an equalizer 4 and sent to the non inverting terminal (+) of a comparator CP constituting part of a comparison unit 5.

Also, a comparison reference voltage VR is applied to the inverting terminal (−) of the comparator CP.

The compared value obtained by comparing the data signal with the comparing reference voltage VR which are applied to the inverting (−) and noninverting (+) terminals of the comparator CP is fed from the output terminal of the comparator CP to the PLL 6 and the data detector unit 7, respectively.

Here, the PLL 6 is used to reproduce the clock signal by utilizing the compared value outputted from the comparator 5 and to transfer the reproduced clock signal to the data detector 7 and the demodulator 8.

The data detector 7 detects a synchronous signal by utilizing the compared value of the comparator 5 and the clock signal of the PLL 6 and sends it to the demodulator 8. Therefore, the demodulator 8 acts to demodulate the modulated digital data signal from the synchronous signal and the clock signal and sends it to the output terminal OUT.

However, the conventional digital signal detecting apparatus as mentioned above has problems in that the differential characteristics and random signal characteristics in high-density data signals recorded on recording media are deteriorated.

SUMMARY OF THE INVENTION

Accordingly, it is an object of the present invention to provide a digital signal detecting apparatus which is adapted to detect high-density digital data signals recorded on a recording medium by a clock signal which is synchronized to a digital data signal reproduced by a reproducing head based on the NRZ-I(Non Return to Zero-Inverting) recording method.

To accomplish the object mentioned above, the present invention comprises:

a rectifier for rectifying a negative voltage of the signal reproduced through a recording head, a reproducing amplifier and an equalizer into a positive voltage;

a comparator for generating a rectangular waveform by comparing the output signal of the rectifier with a reference signal;

a frequency multiplier for multiplying the reproduced signal which is inputted as a level-controlled signal by the comparator;

a PLL for outputting a synchronized clock signal by comparing the phase of the signal outputted from the frequency multiplier with the phase of a frequency-divided signal of the PLL;

a data detector for detecting the original digital data signal from the signal outputted from the comparator by utilizing the clock signal fed from the PLL, for outputting an NRZ (Non Return to Zero) digital data signal to be demodulated in the demodulator.

BRIEF DESCRIPTION OF THE DRAWINGS

The object and features of the present invention will become more readily apparent from the following detailed description of the preferred embodiments taken in conjuction with the accompanying drawings in which:

FIGS. 4A to 4H are waveforms for explaining input/output waveforms for various parts of the digital signal detecting apparatus shown in FIG. 2, respectively.

DETAILED DESCRIPTION OF THE PREFERRED EMBODIMENT

Figure 1:
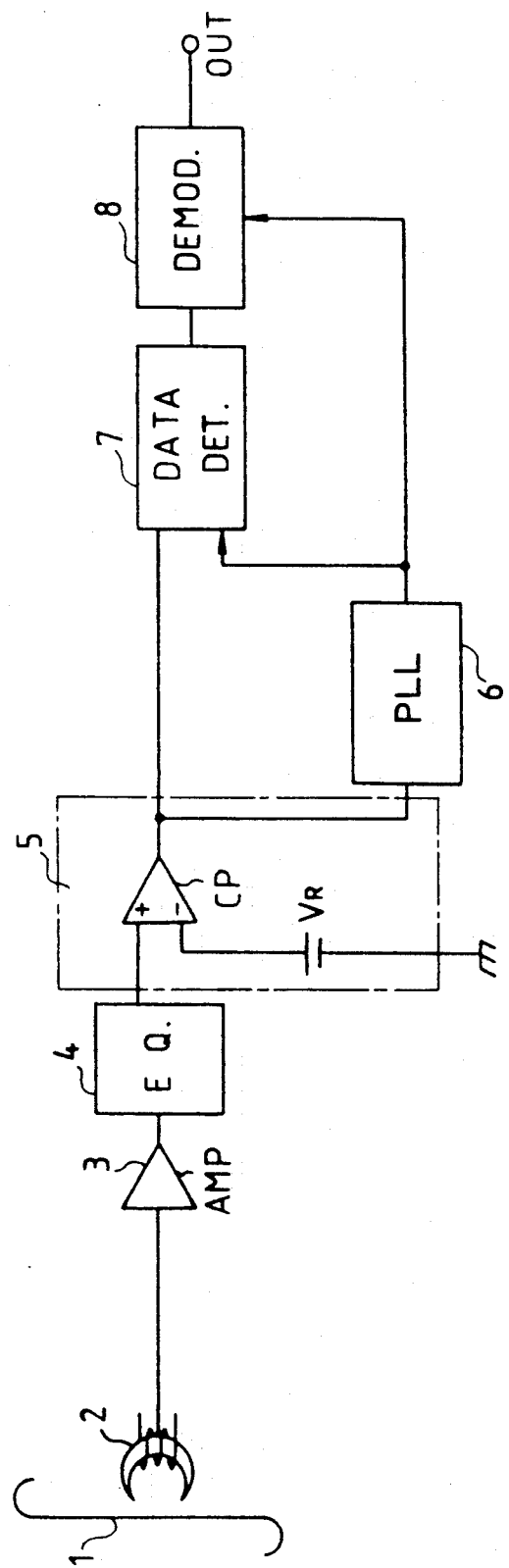
FIG. 1 is a schematic diagram showing a conventional digital signal detecting apparatus.
Figure 2:
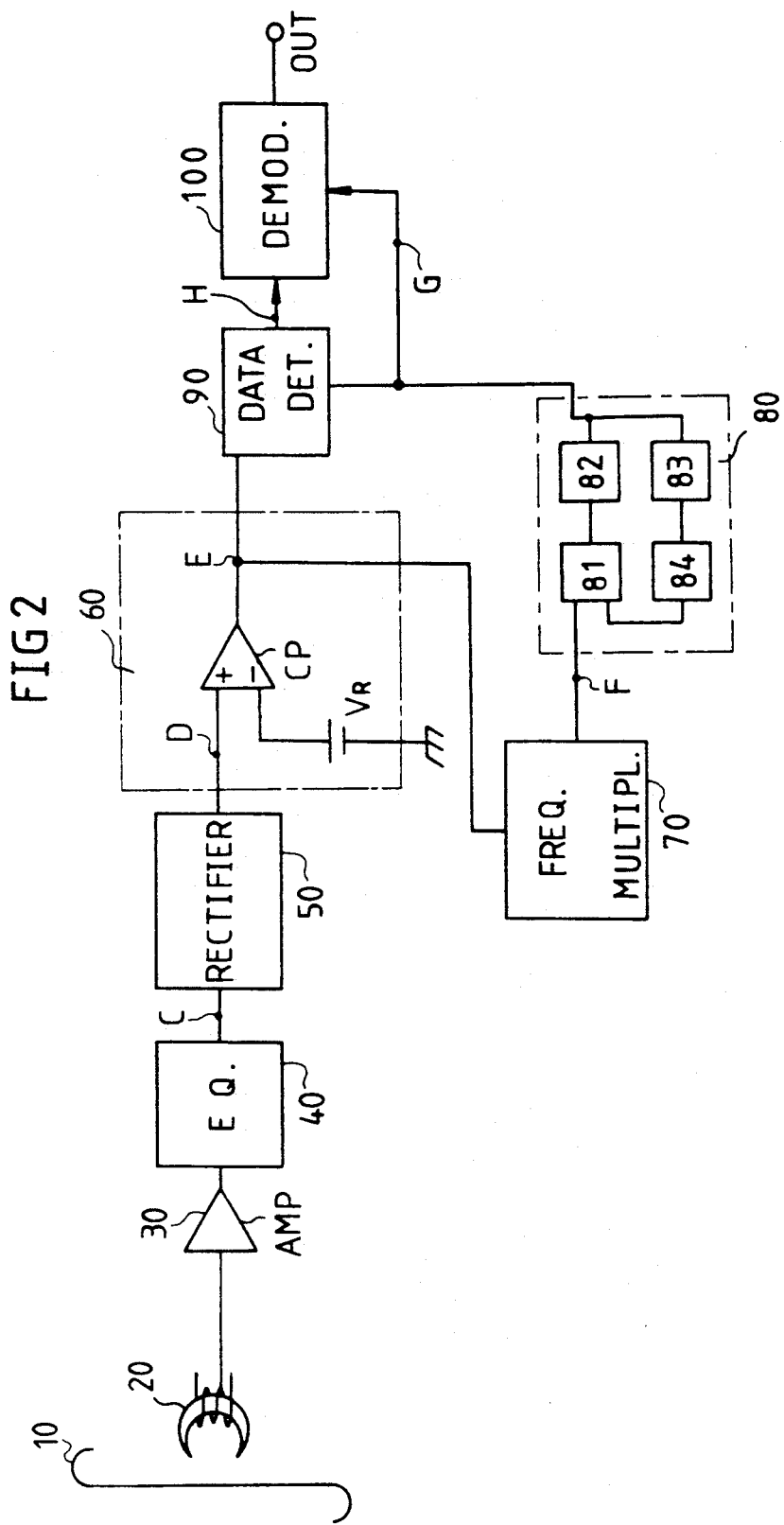
FIG. 2 is a circuit diagram showing a digital signal detecting apparatus according to the present invention.

A digital signal detecting apparatus according to the present invention is shown in FIG. 2.

A rectifier 50 is connected to an equalizer 40 to rectify the negative voltage of the signal reproduced by a reproducing head 20, a reproducing amplifier 30, and an equalizer 40 from a recording medium 10, into a positive signal.

A comparator 60 is connected to the rectifier 50 for generating a rectangular waveform by comparing the output signal of the rectifier with a reference voltager.

A frequency multiplier 70 is used to multiply the reproduced signal inputted from the comparator 60 by two obtain a signal of twice the frequency of the reproduced signal as a level-controlled state, and is coupled with the comparator 60.

A phase locked loop circuit 80 is connected to the frequency multiplier 70 for outputting a synchronized clock signal by comparing the phase of a frequency-divided signal thereof with the phase of the signal outputted from the frequency multiplier 70, and comprises a phase comparator 81, a low-pass filter 82, a voltage controlled oscillator 83 and a frequency divider 84.

Also, a data detector 90 is connected to the comparator 60 for detecting the original digital data signal from the reproduced signal from the comparator 60 by utilizing the clock signal fed from the PLL 80, and for supplying it to the demodulator 100.

Figure 3:
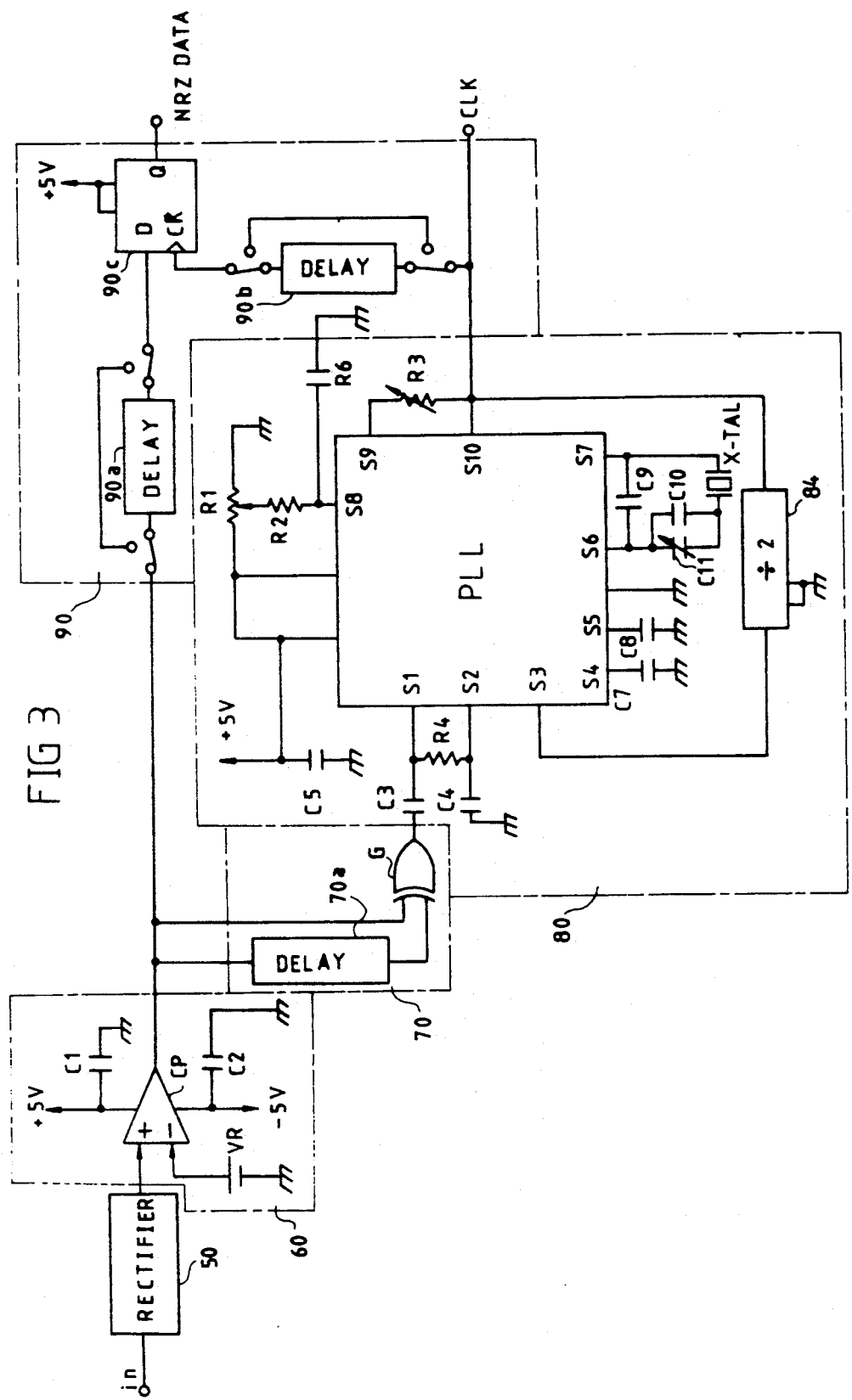
FIG. 3 is detailed circuit diagram of the digital signal detecting apparatus shown in FIG. 2.

FIG. 3 illustrates a detailed circuit diagram of the digital signal detecting apparatus shown in FIG. 2.

In FIG. 3, the voltage applied at the input terminal is a reproduced signal of the high-density digital information recorded on the magnetic medium 10 through the reproducing head 20, reproducing amplifier 30, and the equalizer shown in FIG. 2.

A NRZ-I signal of the NRZ system is recorded on the magnetic tape 10.

Figure 4A:
Figure 4B:
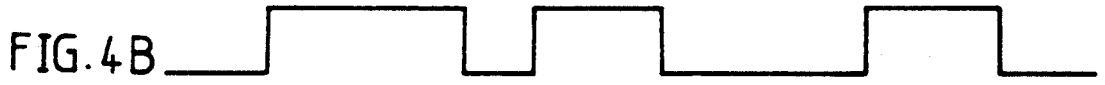
Figure 4C:
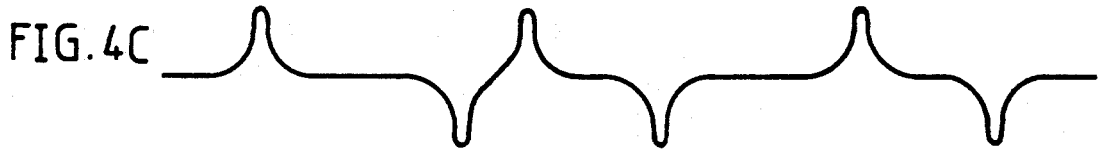

Referring to FIG. 4A as an example which shows NRZ waveforms, it can be seen that the recording current waveform NRZ-I is the same as that shown in FIG. 4B. As is apparent from a comparison of FIGS. 4A and 4B, the NRZ-I recording method signal changes state (or level) for data signals of "1", and remains in the same state for data signals of "0", while the NRZ signal changes its level whenever the data changes from "1" to "0" and vice versa. Since the signal applied to the input terminal as mentioned above has its frequency response compensated in the equalizer 40 of FIG. 2, and takes the waveform of FIG. 4C, the rectifier 50 changes the rectangular pulse with the negative voltage of FIG. 4C, into a positive pulse as shown in FIG. 4D.

Figure 4D:
Figure 4F:

The rectified waveform by the rectifier 50 is inputted in the form of the waveform of FIG. 4D into the noninverting terminal + of the comparator CP which constitutes part of the comparator circuit 60. Also, the comparison reference voltage VR is applied to the inverting terminal of the comparator CP.

The compared value signal outputted from the comparator CP is a rectangular wave signal with the comparison reference voltage VR as the reference and is in the form of the waveform shown in FIG. 4E.

The signal in the form of a rectangular wave which is outputted from the comparator 60 is fed to the frequency multiplier 70 and the data detector 90. The frequency multiplier 70 comprises a delay line 70a and an exclusive OR gate G1, and transforms each positive signal rectangular wave outputted from the comparator 60 into two rectangular waves.

The frequency multiplier 70 is used for the highdensity data records, about 30 Mbps, which are recorded on the magnetic tape medium 10 shown in FIG. 2, and since a 30 MHz clock CLK signal is required for the data rate of 30 Mbps, the pulse width of the waveform outputted from the XOR gate G1 of the frequency multiplier 70 is 30 ns, and the output pulse width of the XOR gate G1 is determined by the delay device 70a.

The phase of the output signal of the XOR gate G which constitutes part of the frequency multiplier 70 is compared with the phase of the clock signal CLK which is frequency-divided through the frequency divider 84 of PLL 80, which also comprises a phase comparator 81, a lowpass filter 82, and a voltage controlled oscillator 83, and so that a synchronous clock signal CLK is obtained.

Figure 4G:

The clock signal CLK is as shown in FIG. 4G.

Meanwhile, the PLL 80 of FIG. 3 shows a PLL circuit made up of a conventional PLL IC chip, where S1-S3 are input terminals of the phase comparator 81, capacitors C7 and C8 are used to make up a low pass filter 82, and the crystal oscillator X-tal and capacitors C9-C11 make up the voltage-controlled oscillator 83.

The resistors R1 and R2 of the PLL 80 are used to control the current of the PLL 80, resistor R3 is used to control the gain of the reproduced clock CLK signal, and the crystal oscillator X-tal is a device for generating an oscillation of 30 MHz.

Meanwhile, D flip-flop 90C of the data detector 90 inputs the output signal of the comparator 60 into the D terminal through delay line 90a, and outputs the NRZ data in accordance with a delayed reproduced clock signal CLK of the PLL 80, which is delayed by the delay line 90b, which is inputted into the clock terminal CK.

Figure 4H:
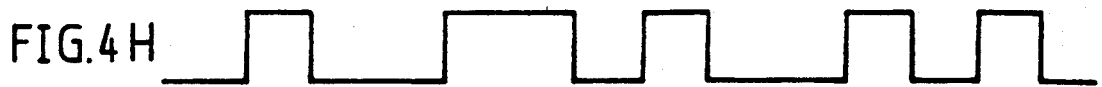

The signal outputted from the Q terminal of D flip-flop 90C is as shown in FIG. 4H, and is inputted into the demodulator 100 of FIG. 2 to be demodulated. A comparison of FIG. 4H with FIG. 4A reveals that the digital signal detecting apparatus transforms the detected NRZ-I signals from the recording medium into NRZ signals which are then demodulated in the conventional manner.

Here, the delay devices 90a and 90b are used to control the timing of the whole system.

As described above, the present invention is able to detect signals of the NRZ system when reproducing high-density digital signals, and has the advantage of detecting data accurately and efficiently when reproducing data from transmitted signals in the field of general communication as well as in systems for recording and reproducing digital signals.

What is claimed is:

1. A digital signal detecting apparatus, comprising:
   transducer means for transducing a digital data signal from a recording medium and generating a transduced signal having positive and negative voltages;
   a rectifier for rectifying the negative voltages of said transduced signal into positive voltages;
   wave shaping means for transforming the rectified signal from said rectifier into a rectangular waveform signal;
   a frequency multiplier for multiplying the frequency of said rectangular waveform signal to generate a multiplied signal having a frequency that is a multiple of the frequency of said rectangular waveform signal;
   a phase locked loop circuit for inputting said multiplied signal from said frequency multiplier and generating a clock signal synchronized with said multiplied signal; and
   a data detector for inputting said rectangular waveform signal and said clock signal and reproducing the digital data signal as recorded on said recording medium, and outputting said reproduced signal to a demodulator to be demodulated.

2. A digital signal detecting apparatus according to claim 1, wherein said transducer means comprises a reproducing head, a reproducing amplifier, and an equalizer.

3. A digital signal detecting apparatus according to claim 2, wherein said wave shaping means comprises a comparator for comparing said rectified signal with a reference voltage to produce said rectangular waveform signal.

4. A digital signal detecting apparatus according to claim 3, wherein said phase locked loop circuit comprises a voltage controlled oscillator, a frequency divider for dividing the frequency of an output signal of said voltage controlled oscillator, and a phase comparator for comparing the phase of said multiplied signal with the phase of the frequency-divided signal from said frequency divider and outputting a comparison signal to an input of said voltage controlled oscillator.

5. A digital signal detecting apparatus according to claim 4, wherein said frequency multiplier comprises an exclusive-OR circuit and a first delay circuit, said rectangular waveform signal being applied to an input of said delay circuit and one input of said exclusive-OR circuit, an output of said delay circuit being applied to another input of said exclusive-OR circuit.

6. A digital signal detecting apparatus according to claim 5, wherein said data detector comprises:
   a second delay circuit having an input connected to receive said rectangular waveform signal;
   a third delay circuit having an input connected to receive said clock signal; and
   a flip-flop circuit for receiving outputs of said second and third delay circuit as data and clock signal inputs, respectively, and outputting said reproduced digital data signal.

7. A digital signal detecting apparatus according to claim 6, wherein said reproduced digital data signal is an NRZ (Non Return to Zero) data signal.

* * * * *

UNITED STATES PATENT AND TRADEMARK OFFICE
CERTIFICATE OF CORRECTION

PATENT NO. : 5,166,836
DATED      : November 24, 1992
INVENTOR(S): Young-jun Choi It is certified that error appears in the above-identified patent and that said Letters Patent is hereby corrected as shown below:

Title page, item (56) U.S. Patent Documents, delete "4,716,475 12/1987 Dutcher ..................360/46"

Col. 2, line 35, "voltager" should be --voltage $V_R$--.

Col. 3, line 27, delete "tape".

Signed and Sealed this

Ninth Day of November, 1993

Attest:

BRUCE LEHMAN

Attesting Officer

Commissioner of Patents and Trademarks